United States Patent [19]

Hawley et al.

[11] Patent Number: 5,104,837
[45] Date of Patent: Apr. 14, 1992

[54] CATALYST AND POLYMERIZATION OF OLEFINS

[75] Inventors: Gil R. Hawley, Dewey; Max P. McDaniel, Bartlesville, both of Okla.

[73] Assignee: Phillips Petroleum Company, Bartlesville, Okla.

[21] Appl. No.: 494,378

[22] Filed: Mar. 16, 1990

[51] Int. Cl.⁵ .................................................. C08F 4/64
[52] U.S. Cl. ...................................... 502/107; 502/111; 502/125; 502/127; 502/132; 502/133; 502/134; 526/124
[58] Field of Search .............. 502/107, 111, 125, 127, 502/132, 133, 134

[56] References Cited

U.S. PATENT DOCUMENTS

| | | | |
|---|---|---|---|
| 3,135,809 | 6/1964 | Bosmajian | 502/114 |
| 4,258,159 | 3/1981 | Bienfait | 526/114 |
| 4,315,999 | 2/1982 | Matsuura et al. | 526/114 |
| 4,421,674 | 12/1983 | Invernizzi et al. | 502/154 |
| 4,458,058 | 7/1984 | Dombro | 526/129 |
| 4,473,660 | 9/1984 | Albizzati et al. | 502/124 |
| 4,477,586 | 10/1984 | McDaniel | 502/104 |
| 4,634,747 | 1/1987 | Best | 526/124 |
| 4,666,990 | 5/1987 | Candlin et al. | 525/268 |
| 4,745,164 | 5/1988 | Schweier et al. | 526/125 |
| 4,855,271 | 8/1989 | McDaniel et al. | 502/107 |

*Primary Examiner*—Patrick P. Garvin
*Assistant Examiner*—Brent M. Peebles
*Attorney, Agent, or Firm*—Edward L. Bowman

[57] ABSTRACT

A catalyst useful for polymerizing olefins is prepared by contacting a highly porous magnesium-containing aluminum oxide support with an alcohol, then contacting the resulting solid with a mixture of titanium tetrachloride and dialkyl phthalate, and then contacting the resulting solid with additional titanium tetrachloride.

17 Claims, No Drawings

CATALYST AND POLYMERIZATION OF OLEFINS

BACKGROUND OF THE INVENTION

This invention relates to supported catalysts containing titanium and magnesium. In one aspect this invention relates to catalysts useful for the polymerization of olefins. In a more specific aspect the present invention relates to catalysts useful for the polymerization of polypropylene.

A number of supported catalysts containing titanium and magnesium are known, for example, U.S. Pat. No. 3,787,384 discloses one in which a support of silica, alumina, or a mixture thereof is contacted with either a hydrocarbyl magnesium, a hydrocarbyl halogen magnesium, a hydrocarbyl aluminum, or a hydrocarbyl hydrogen aluminum compound, followed by an excess amount of a halogen compound of a transition metal.

U.S. Pat. No. 3,993,588 is another which discloses preparing a catalyst component by contacting silica with a magnesium compound and by contacting the resulting component with a titanium compound.

U.S. Pat. Nos. 4,458,058 and 4,258,159, the disclosures of which are incorporated herein by reference disclose preparing catalysts by contacting a transition metal compound with a porous aluminum oxide support which had been contacted with a magnesium compound.

Commonly owned, recently issued U.S. Pat. No. 4,855,271, the disclosure of which is incorporated herein by reference, discloses a still more unique type of supported catalyst containing titanium and magnesium. The catalysts disclosed in that patent are prepared by contacting a support comprising highly porous aluminum oxide containing a magnesium compound first with an alcohol and then subsequently with a halide, alkoxide, or haloalkoxide of titanium. While these catalysts have proven to have desirable properties particularly in the production of polymers from ethylene, they have not been found to be as commercially useful for the production of crystalline polypropylene by the polymerization of propylene. In the polymerization of propylene, it was found that the catalysts were not as active nor as selective to the hydrocarbon insoluble crystalline polypropylene as might be desired.

An object of the present invention is to provide a new catalyst with improved selectivity for the production of crystalline polypropylene.

Another object of the present invention is to provide a new type of catalyst which is capable of also providing a desirable balance of productivity and selectivity.

SUMMARY OF THE INVENTION

In accordance with the present invention, the catalyst is prepared by contacting a substantially dry support comprising highly porous aluminum oxide containing a magnesium compound with about 2 to about 5 moles of alcohol per mole of magnesium, then contacting the resulting product first with a mixture of titanium tetrachloride and at least one dialkyl ester of phthalic acid, and then with an activating agent comprising titanium tetrachloride.

DETAILED DESCRIPTION OF THE INVENTION

The support for the catalyst of this invention is prepared from highly porous aluminum oxide. The internal porosity of the starting alumina can vary widely. The internal porosity can be defined as the ratio of the pore volume to the material weight and can be determined using the technique known by the name of BET technique, described by S. Brunauer, P. Emmett and E. Teller in J. Am. Chm. Soc., 60, p. 309–319 (1938) or some comparable technique. For the present invention aluminum oxides having internal porosity of more than about 0.3 milliliters/gram, preferably at least about 0.5 milliliters/gram, and still more preferably at least about 1 milliliter/gram.

The porous aluminum oxides used in preparing the inventive catalyst generally should have a specific surface area greater than 50 square meters/gram, more usually on the order of about 150 to about 500 square meter/gram. The specific areas are measured in accordance with the technique of Brunauer, Emmett, and Teller using a standardized method such as the one described in British Standards 4359, Part I (1969).

The particle size distribution of the porous aluminum oxides can vary widely, however, a narrow support particle size is currently preferred. Generally, the porous aluminum oxide should have a mean particle diameter of at least about 20 microns and preferably at least 50 microns. If fine porous aluminum oxide is used the particle size of the resulting polymer will generally be smaller than if a coarser porous aluminum oxide is used. Porous aluminum oxides having a mean particle diameter larger than 200 microns are generally not preferred because they tend to result in polymers which have bulk densities that are lower than generally desired. Also it is generally preferred to use porous aluminum oxide particles which have a generally spherical shape.

The exact chemical structure and the method of preparation of the porous aluminum oxides used in this invention are not particularly critical, provided that they contain aluminum bonded to oxygen in their molecule. Such porous aluminum oxides can be chosen from amongst simple aluminas and complex oxides of aluminum and at least one other metal. Examples of processes for preparing such simple and complex oxides of aluminum are disclosed in U.S. Pat. No. 4,258,159, the disclosure of which is incorporated herein by reference, especially column 2, line 49 through column 3, line 58.

The porous aluminum oxide preferably contains at least 90 weight percent aluminum oxide and most preferably at least 99 weight percent aluminum oxide. Preferably the aluminum oxide is one that has been subjected to a thermal treatment prior to being contacted with the magnesium. Such thermal treatments are generally carried out at temperatures in the range of about 100° to about 1000° C., more preferably about 300° to about 800° C.

The term magnesium compound as used herein is intended to include inorganic and organic magnesium compounds. Typical examples of inorganic magnesium compounds include magnesium oxide, hydroxide, hydroxychloride, hydroxybromide, halide, carbonate, acetate, nitrate, and the like, including complexes of such with electron donors such as alcohols, ammonia, water, and the like. The currently preferred inorganic magnesium compounds are magnesium halides, particularly commercially available anhydrous magnesium dichloride.

Examples of organic magnesium compounds include magnesium compounds containing organic radical bonded to magnesium via oxygen. Typically the organic radicals that are bonded to magnesium via oxygen containing 1 to 20 carbon atom, more preferably 1 to 6 carbon atom. Such organic radicals can be saturated or unsaturated, with branched, straight or cyclic chains; they can also be substituted by and/or contain heteroatoms such as O, S, N, P, and the like. The currently most preferred radicals are hydrocarbyl radicals, particularly the alkyl, alkenyl, aryl, cycloalkyl, aralkyl, alkylaryl, and acyl radicals. Some specific examples of such organic oxygen-containing magnesium compounds include magnesium alkoxides such as magnesium methylate, ethylate, methoxy ethylate, isopropylate, decanolate, cyclohexanolate, and benzylate; magnesium phenoxides, such as magnesium phenate, naphthenate, anthracentate, phenantrenate, and cresolate; hydrated magnesium carboxylates such as magnesium acetate, stearate, benzoate, phenylacetate, adipate, phthalate, acrylate, and oleate. Other examples include magnesium chloroalkoxides and chlorophenoxides.

Another example of an organic magnesium compound includes compounds of the formula $MgR_2$ wherein one R is a hydrocarbyl radical and the other R is a hydrocarbyl radical or hydrogen. The preferred type of such compounds are the dialkylmagnesiums in which each R is an alkyl group containing 1 to 10 carbon atoms, more preferably 1 to 6 carbon atoms. Some specific examples include dimethylmagnesium, ethyl-n-butyl magnesium, n-butyl-s-butylmagnesium and di-n-hexylmagnesium.

The magnesium can be added to the porous support in any suitable manner. For example, the support can be impregnated with the magnesium compound in any suitable manner. One technique would include heating a mixture of the magnesium compound and the alumina at a temperature in the range of about 100° C. to about 800° C. When such a melting technique is used the temperature should preferably be kept below those levels which would adversely affect the structure and thus the porosity of the alumina.

The currently preferred technique involves impregnating the porous aluminum oxide support with a solution of the magnesium compound.

According to one embodiment of this invention the porous aluminum oxide support which is used is subjected to a thermal treatment prior to the contacting of the aluminum oxide support with the magnesium compound. This treatment is generally carried out at a temperature in the range of 100° C. to about 1000° C., more preferably about 300° C. to about 800° C. The temperature at which the support is heated is chosen to be below the temperature at which the support material starts to sinter to prevent decrease in the pore volume and the specific area. It is preferred to conduct the treatment at atmospheric pressure and in an inert atmosphere although pressure and atmospheric conditions are not absolutely critical. The duration of the heat treatment is not critical and generally lasts between 1 and 24 hours.

The porous aluminum oxide support can be impregnated with the magnesium compound in any suitable solvent. The particular solvent selected will of course vary depending upon the magnesium compound being employed. The currently preferred technique involves employing aqueous solutions of magnesium compounds that are dissolved in water.

When aqueous solutions of magnesium compounds are used in preparing the catalyst it is necessary to ensure that the resulting aluminum magnesium support is sufficiently dry. Typically this would involve drying the impregnated alumina at a temperature in the range of about 30° C. to about 800° C., more preferably about 80° C. to about 400° C. It is preferred to conduct the drying at atmospheric pressure and in an inert atmosphere although the pressure and atmosphere conditions are not considered to be critical. The degree of drying required and the time needed can readily be determined by routine experimentation.

Most preferably the drying of the magnesium-containing aluminum oxide support involves calcining at a temperature of at least about 300° C. and then conducting chemical dehydration by contacting the resulting solid with $SiCl_4$, $SiHCl_3$, silylamines or the like prior to the contacting of the catalyst with the alcohol.

The amount of magnesium included in the support can vary over a wide range, however, typically it would be such that the magnesium, if taken as present as elemental magnesium, would be equal to about 1 to about 8 weight percent of the resulting substantially dry magnesium-aluminum oxide support. Some of the preferred ranges for the amount of magnesium for particular types of magnesium-aluminum oxide supports are disclosed in U.S. Pat. Nos. 4,855,271; 4,458,058; and 4,258,159, the disclosures of which are incorporated herein by reference.

The alcohol used in forming the catalyst is selected from the lower alcohols, for example, the alcohols containing up to about 12 carbon atoms. Examples include methanol, ethanol, normal propanol, isopropanol and isobutanol. It is currently preferred to use alcohols containing 2 to 3 carbon atoms per molecule, especially ethanol and the propanols.

The amount of alcohol employed is not considered to be particularly critical, however, it is desirable to use an amount which causes substantial swelling of the support. Typically the molar ratio of the alcohol to the magnesium in the support would be in the range of from about 0.25/1 to about 6/1, more preferably about 1/1 to about 4/1. The contacting merely involves slurrying the support and the alcohol. The temperature is not considered to be particularly critical. Generally the contacting is carried out at a temperature in the range of about 20 degrees C. to about 100 degrees C., usually but not necessarily in a hydrocarbon slurry. Preferably the resulting solid is then washed with a hydrocarbon such as heptane.

After the magnesium-containing aluminum oxide support has been contacted with the alcohol, the resulting solid is contacted with a mixture of titanium tetrachloride and at least one dialkyl ester of phthalic acid. Typically the alkyl groups of the dialkyl ester will have 1 to 10 carbon atoms, more preferably 1 to 5 carbon atoms. The currently preferred dialkyl ester is diisobutylphthalate. Preferably, the support is contacted with the mixture in a hydrocarbon slurry at a temperature in the range of about 20 to about 150 degrees C. The optimum time for the treatment can readily be determined by routine experimentation. Preferably, after the contacting the resulting solid is washed with a hydrocarbon such as heptane.

The molar ratio of the dialkyl ester to the titanium tetrachloride in said mixture is generally in the range of about 0.01 to about 10.0, more preferably about 0.1 to 1.0. The molar ratio of the titanium tetrachloride to the magnesium in the porous support in this step is generally in the range of 1/1 to 100/1, more preferably 1/1 to 20/1, still more preferably about 10/1.

After the step involving the dialkyl ester the recovered solid is contacted with an activating amount of an activating agent comprising titanium tetrachloride. The activating agent can include other halogen-containing compounds. Typically, but not necessarily, the activating agent is contacted with a hydrocarbon slurry of the alcohol treated magnesium-containing support. Again this is typically carried out at a temperature in the range of about 20 to about 150 degrees C. and the resulting solid is washed with a hydrocarbon such as heptane to yield the improved solid catalyst of the present invention. Mixtures of titanium tetrachloride and trichlorsilane and/or silicon tetrachloride have been found useful as activating agents. The optimum amount of activating agent can be determined by routine experimentation. Excess agent can be used and is generally removed during the above-mentioned washing step.

For the polymerization of olefins the inventive catalyst is generally employed in combination with an organometallic cocatalyst comprising an organic compound of a metal selected from Groups IA, IIA, IIB, IIIA, and IVA of the Periodic Table, such as organic compounds of lithium, magnesium, zinc, aluminum, and tin. The currently preferred cocatalysts are organic aluminum compounds, such as aluminum trialkyls, dialkyl aluminum halides, and alkyl aluminum hydrides. Instead of alkyl groups, also one or more unsaturated hydrocarbon radicals can be bonded to the aluminum of the cocatalyst. The currently preferred organometallic cocatalysts is triethyl aluminum.

The catalyst of the invention can be used for the polymerization of ethylene, propylene, butylene, pentene, hexene, 4-methylpentene, and other alpha-alkenes having at least three carbon atoms and also for mixtures thereof. They can also be used in the copolymerization of one or more alpha-olefins with polyunsaturated compounds.

In the polymerization of homopolymers of higher alkenes such as propylene it has generally been found desirable to employ in the cocatalyst system an organic ester compound such as methyl para toluate or a compound such as phenyl triethoxy silane.

The polymerization can be carried out in any known way, such or in liquid monomer, as in solution, or in suspension in a solvent or a hydrocarbon diluent, or in the gas phase. In the case of polymerization carried out in solution or suspension, the solvents or diluents are selected from those compounds previously discussed as useful for the washing of the catalyst complex. Examples include alkanes and cyclalkanes specifically compounds such as butane, pentane, hexane, heptane, cyclohexane, methylcyclohexane, and the like. The polymerization can be carried out discontinuously or continuously, at atmospheric pressure or at elevated pressures up to 2000 kilograms/cm$^2$. By carrying out the polymerization under pressure, the polymer yield is enhanced, resulting in a polymer with a relatively low catalyst residue concentration. It is preferred to carry out the polymerization at pressures between about 1 to about 100 kilograms/cm$^2$, and particularly between about 10 to about 70 kilograms/cm$^2$.

A further understanding of the present invention and its various objectives and advantages will be provided by referring to the following examples.

EXAMPLE I

Support Preparation

The 25 wt. % MgCl$_2$ support was prepared by aqueously impregnating (100 to 200 mesh) KETJEN B alumina with magnesium chloride. After the impregnation, the resulting product was dried first to 85° C. and then calcined at 300° C. The resulting solid was then treated with silica tetrachloride and 300° C. in nitrogen to ensure substantial dryness.

EXAMPLE II

Catalyst Preparation

Under an argon atmosphere, 2 grams of the dry aluminum oxide magnesium-containing support of Example I was combined with 100 milliliters of heptane and 0.9 milliliters of ethyl alcohol in a 10 oz. bottle. The contents were stirred for one-half hour at room temperature. The solids were then washed four times by decantation with heptane.

The solid was then combined with 100 mililiters of heptane and then 5 milliliters of titanium tetrachloride was added followed by the addition of 5 milliliters of diisobutylphthalate (DIBP). The resulting mixture was then heated at 100° C. for 1 hour. After cooling for 15 minutes, the solids were washed four times with heptane. The solids were isolated by vacuum filtration under an argon atmosphere. These solids are referred to herein as catalyst precursor A.

About one-half of catalyst precursor A was then combined with about 100 milliliters of heptane in a bottle and 5 milliliters of titanium tetrachloride was added. The contents of the bottle was then heated for 1 hour at 100° C. The resulting solids were again washed four times using heptane decantation. The resulting dry solids are referred to herein as Catalyst 1.

A comparative catalyst referred to herein as Catalyst 2 was prepared in the same manner as Catalyst 1 except that 5 milliliters of silica tetrachloride was used to replace the 5 milliliters of titanium tetrachloride in the step which involved the use of DIBP.

Another comparative catalyst was prepared which will be referred to herein as Catalyst 3. Catalyst 3 was prepared in the same manner as Catalyst 1 except that 5 milliliters of trichlorosilane was used to replace the 5 milliliters of titanium tetrachloride in the step involving the use of the DIBP.

Still another comparative catalyst was prepared which will be referred to herein as Catalyst 4. Catalyst 4 was prepared in the same manner as Catalyst 1 except that 10 milliliters of a 15 weight percent heptane solution of triethylaluminum was used to replace the 5 milliliters of titanium tetrachloride in the step involving the use of the DIBP.

EXAMPLE III

This example demonstrates the preparation of a catalyst of the general type disclosed in U.S. Pat. No. 4,855,271. About 2 grams of the magnesium containing porous aluminum oxide support of Example I, was combined with 100 milliliters of heptane and 0.9 milliliters of ethanol. Contents were stirred for 1 hour at room temperature and then washed four times by decantation using heptane. The solids were then reslurried in heptane and 20 milliliters of a 15 weight percent heptane solution of triethylaluminum was added. The mixture was then heated for 1 hour at 100° C. The resulting solids were then washed four times by decantation, and then reslurried in heptane. Then about 5 milliliters of titanium tetrachloride was added to the slurry. The slurry was heated for one hour at 100° C. and then allowed to cool 15 minutes. The resulting solids were washed four times by decantation with heptane and then combined with another 100 milliliters of heptane. To this slurry was then added 5 milliliters of titanium tetrachloride. The resulting slurry was then heated for 1 hour at 100° C. and allowed to cool for 15 minutes. After being washed four times by decantation with heptane the solids were then isolated in an argon glove box by vacuum filtration to yield the Control catalyst.

EXAMPLE IV

The catalysts of the Examples II and III were then evaluated for their effectiveness in the polymerization of propylene. Liquid propylene was polymerized in a stainless steel 1 liter stirred autoclave reactor at 70° C. with 10 psi of hydrogen present. Each catalyst was evaluated using two different cocatalyst systems. In one polymerization the cocatalyst system was a mixture of triethylaluminum (TEA) and methyl para toluate (MPT), wherein the molar ratio of the triethylaluminum to the methyl para toluate was about 3. In the other polymerization the cocatalyst system was a mixture of triethylaluminum and phenyl triethoxysilane, i.e. $\phi Si(OEt)_3$, wherein the molar ratio of the triethylaluminum to the phenyl triethoxysilane about 3 to 1. The relative effects of the various catalysts in terms of productivity, i.e. gram of polymer per gram of catalyst per hour, and percent soluables is shown in Table I.

TABLE I

| Run | Step 2 Mixture | Cocatalyst | Productivity | % Solubles $C_3$ | Xylene |
|---|---|---|---|---|---|
| 1 | TiCl$_4$ + DIBP | A | 16.7 | 0 | 2.5 |
| 2 | TiCl$_4$ + DIBP | B | 151.0 | 4.4 | 1.9 |
| 3 | SiCl$_4$ + DIBP | A | 1.0 | 0 | — |
| 4 | SiCl$_4$ + DIBP | B | 2.6 | 0 | — |
| 5 | HSiCl$_4$ + DIBP | A | 0 | — | — |
| 6 | HSiCl$_4$ + DIBP | B | 5.6 | 0 | — |
| 7 | TEA + DIBP | A | 18.0 | 54 | 3.7 |
| 8 | TEA + DIBP | B | 27.7 | 51 | — |
| 9 | Control (None) | A | 143.0 | 13 | — |
| 10 | Control (None) | B | 282.0 | 9 | — |

A = 3 TEA + MPT
B = 3 TEA + $\phi$Si(OEt)$_3$

Runs 9 and 10 of Table I show that the control catalyst of the general type shown in U.S. Pat. No. 4,855,271 provides much higher productivity than Inventive Catalyst 1 used in Runs 1 and 2. The control catalysts however also produce polymer having amounts of propylene soluables that are generally higher than would be desired.

Runs 1 and 2 in Table I employ an inventive catalyst. Although the productivity is lower than that obtained using the control catalyst the percent soluables are much more desirable.

Runs 3–8 demonstrate that the benefits obtained by contacting the ethanol treated support with DIBP and etching agents of the type disclosed in the prior art, other than titanium tetrachloride, did not provide catalysts giving desirable results.

EXAMPLE V

A modified sample of catalyst 1 was prepared by placing an amount of the dried Catalyst 1 in 50 milliliters of heptane and then adding 5 milliliters of a solution made up of 5 milliliters of a 15 weight percent heptane solution of triethylaluminum and 0.2 milliliters of phenyl triethoxysilane. The resulting slurry was stirred for 1 hour at room temperature and then the solids were washed and isolated as in the other catalyst preparations. This pretreatment had little effect on the catalyst performance; however, it is considered that it would make it possible to feed the catalyst in a separate stream from the cocatalyst which could be desirable from a process point of view.

That which is claimed is:

1. A process for preparing a catalyst comprising contacting a substantially dry support comprising aluminum oxide and a magnesium compound with about 2 to about 5 moles of alcohol per mole of magnesium, then contacting the resulting product first with a mixture of titanium tetrachloride and at least one dialkyl ester of phthalic acid, and then with an activating agent comprising titanium tetrachloride.

2. A process according to claim 1 wherein said support is formed by impregnating a highly porous alumina containing at least about 90 weight percent alumina and having a specific area greater than about 50 square meters per gram with a magnesium compound.

3. A process according to claim 1 wherein said support is formed by impregnating porous alumina with a magnesium compound wherein said alumina has an internal porosity of at least about 0.5 ml/gm and which has been calcined at a temperature in the range of about 100° C. to about 1000° C. prior to being contacted with the magnesium compound.

4. A process according to claim 3 wherein said magnesium compound is selected from the group consisting of magnesium oxide, magnesium hydroxide, magnesium hydrochloride, magnesium carbonate, magnesium nitrate, magnesium alkoxides, magnesium alkoxides, and dialkylmagnesium.

5. A process according to claim 4 wherein said alcohol is ethanol.

6. A process according to claim 5 wherein said magnesium-containing alumina is subjected to a chemical dehydration prior to being contacted with the ethanol.

7. A process according to claim 6 wherein said chemical dehydration is carried out by contacting the magnesium-containing alumina with SiCl$_4$.

8. A process according to claim 7 wherein said porous alumina is impregnated with an aqueous solution of magnesium dichloride.

9. A process according to claim 8 wherein the alkyl groups of said dialkyl phthalate each have 1 to 5 carbon atoms.

10. A process according to claim 9 wherein said dialkylphthalate consists essentially of diisobutylphthalate.

11. A process according to claim 10 wherein the solid resulting after the alcohol contact is washed with a hydrocarbon, the solids recovered after hydrocarbon washing are contacted with the mixture of titanium tetrachloride and diisobutylphthalate and those solids are washed with a hydrocarbon before being contacted with additional titanium tetrachloride.

12. A process according to claim 5 wherein said magnesium compound is a magnesium alkoxide in which the alkyl groups each contains 1 to 6 carbon atoms.

13. A process according to claim 5 wherein said magnesium compound is a dialkyl magnesium in which each alkyl group contains 1 to 6 carbon atoms.

14. A catalyst prepared according to the process of claim 12.

15. A catalyst prepared according to the process of claim 13.

16. A catalyst prepared according to the process of claim 11.

17. A catalyst prepared according to the process of claim 10.

* * * * *